United States Patent [19]

Brindley et al.

[11] 3,995,767
[45] Dec. 7, 1976

[54] BATTERY DISPENSER

[75] Inventors: Robert E. Brindley, New York, N.Y.; Francis Stahl, St. Albans, Vt.

[73] Assignee: Union Carbide Corporation, New York, N.Y.

[22] Filed: Oct. 15, 1975

[21] Appl. No.: 514,732

[52] U.S. Cl. .................................. 221/82; 206/333
[51] Int. Cl.² ...................................... B65D 85/42
[58] Field of Search ............... 221/2, 5, 7, 76, 79, 221/80, 81, 82, 83, 86; 206/333, 37, 538, 539, 533

[56] References Cited
UNITED STATES PATENTS

| | | | |
|---|---|---|---|
| 2,081,656 | 5/1937 | Anthony | 206/333 X |
| 3,227,127 | 1/1966 | Gayle | 221/2 X |
| 3,414,161 | 12/1968 | Doring | 221/2 |
| 3,433,351 | 3/1969 | Zaborney | 206/37 |
| 3,712,695 | 1/1973 | Kaye | 206/333 X |

FOREIGN PATENTS OR APPLICATIONS

| | | | |
|---|---|---|---|
| 1,045,650 | 10/1966 | United Kingdom | 206/333 |

*Primary Examiner*—Robert B. Reeves
*Assistant Examiner*—Francis J. Bartuska
*Attorney, Agent, or Firm*—Eugene Lieberstein

[57] ABSTRACT

Battery dispenser including a flat, circular molded plastic casing comprising co-fitting upper and lower casing halves defining an enclosure with the upper casing half being rotatable and including a series of openings in its top wall for insertion of a voltmeter probe to contact the upper terminal surface of each one of a plurality of small, miniature button cell batteries held in the lower casing half in a spaced apart, circular row arrangement, the upper casing half further including a discharge outlet which circumscribes one of the series of openings and which is normally closed by a cover cap attached to the top wall by an integral flexible hinge. A conductor element is positioned internal of the enclosure in the form of a circular ring with branch elements extending therefrom in contact with the lower terminal surface of each battery. A small aperture is formed in the top wall of the upper casing half and arranged relative to the circular ring section of the conductor for insertion of the other voltmeter probe. Detents are provided for indexing the discharge outlet with each individual battery and for aligning the series of openings with the batteries in the lower casing half.

15 Claims, 5 Drawing Figures

U.S. Patent    Dec. 7, 1976    3,995,767
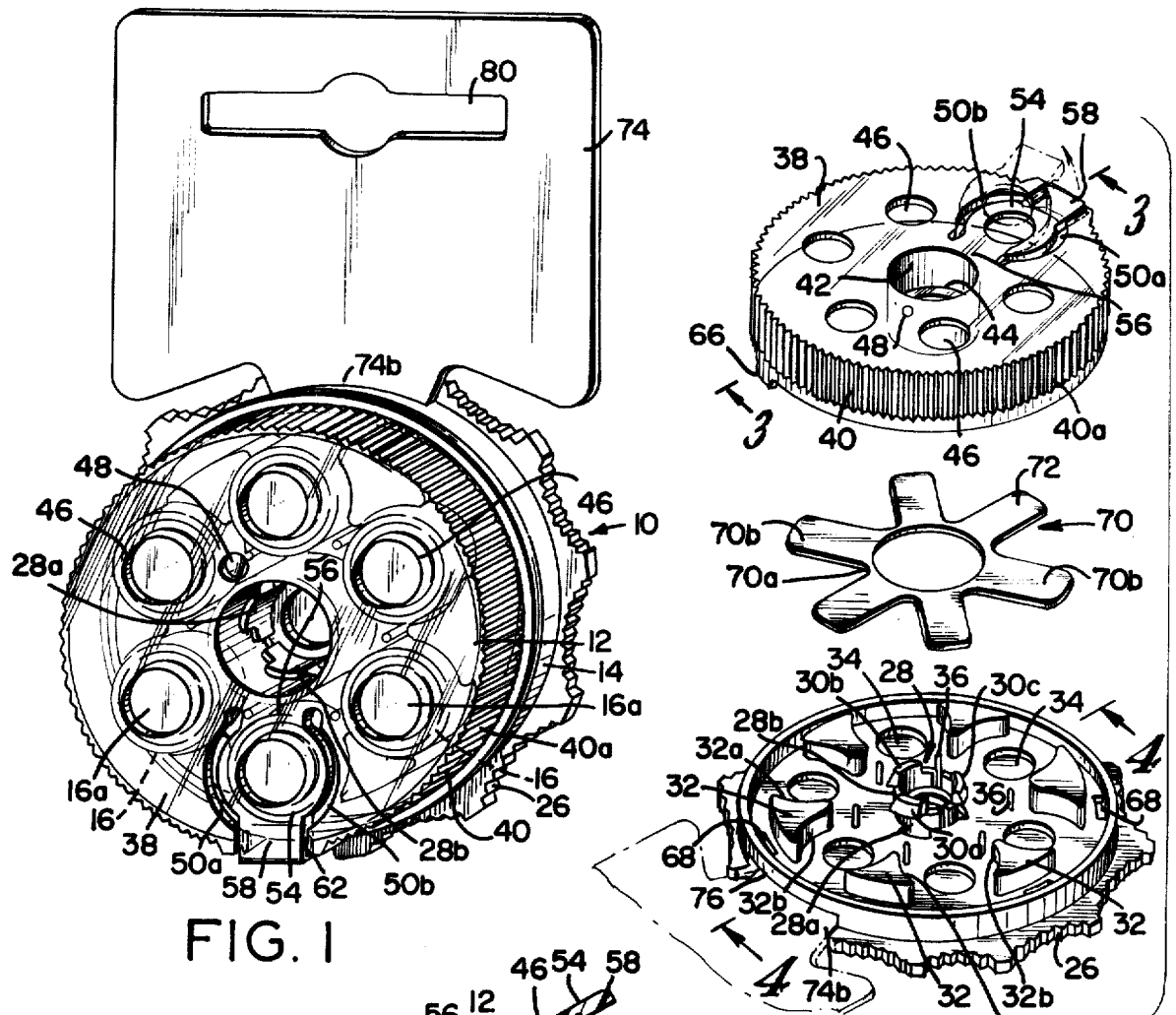
FIG. 1
FIG. 2
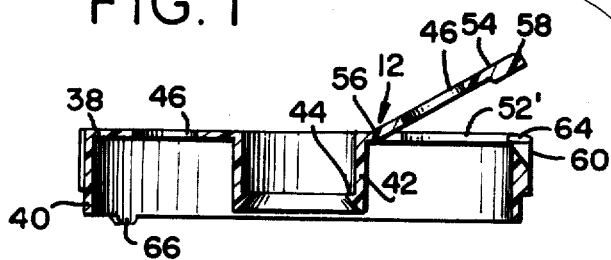
FIG. 3
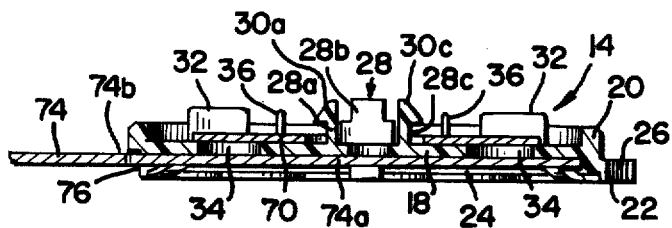
FIG. 4
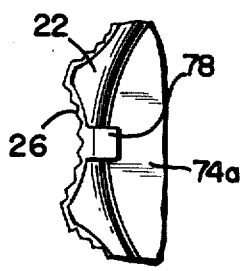
FIG. 5

BATTERY DISPENSER

BACKGROUND OF THE INVENTION

The present invention relates to dispensing devices in general, and more particularly to improvements in a battery dispenser for storing and dispensing a plurality of small, miniature button cell batteries, e.g., hearing-aid batteries, having terminal surfaces on opposite ends thereof wherein means are provided for checking the voltage of the individual batteries without removing them from the dispenser. In certain conventional battery dispensers of this type, one wall of the dispenser has been formed with a series of openings through which one probe of a voltmeter may be inserted to contact the terminal surface on one end of each battery for checking the voltage of the same. Contact with the other terminal surface on the opposite end of each battery has been made through the provision of a separate conductive member. Conveniently this conductive member has been provided in the form of a conductive metal surface applied to one side of a hanger or display card. Part of the hanger or display card is mounted inside the dispenser with the conductive metal surface placed in contact with the other terminal surfaces on the opposite ends of the batteries. Accordingly, the user when checking the voltage of the individual batteries simply places the other meter probe in contact with the conductive metal surface to complete the test circuit. However, such an arrangement possesses certain inherent disadvantages, for example, if the hanger or display card is torn off by the user for convenience in carrying the dispenser, there is no way to later check the voltage of individual batteries other than by removing all of the batteries from the dispeneser.

Accordingly, it is an important object of the present invention to provide a simple and inexpensive battery dispenser of the character described wherein means are provided for checking the voltage of the individual batteries with or without the cardboard hanger or display card intact.

Another object of the invention is to provide such a battery dispenser wherein improved means are provided for individually dispensing one battery at a time from the dispenser.

SUMMARY OF THE INVENTION

The invention resides in a battery dispenser comprising a flat, molded plastic casing which is preferably made of first and second casing members cofitting together so as to define therebetween an enclosure for storing a plurality of small, miniature button cell batteries having terminal surfaces on opposite ends thereof e.g., hearing-aid batteries. The first casing member is preferably circular in shape and is axially mounted to the second casing member such that the former may be freely rotated about its axis while the latter is held stationary. The second casing member includes means for holding the plurality of batteries spaced apart from one another and in a circular row arrangement. The first casing member includes a series of openings which are also spaced apart from each other and arranged in a circular row, these openings being adapted to register with the plurality of batteries in the second casing member and to expose the terminal surfaces on one end of each battery for contact with one probe of a voltmeter which is inserted through each opening to check the voltage of each battery. The first casing member further includes an outlet for dispensing one battery at a time from the dispenser. This outlet circumscribes one of the series of openings and is normally closed by an integral, flexible hinged cover which lies flush with the top surface of the first casing member. Means are provided for indexing the dispensing opening with each individual battery as the first casing member is rotated and for registering the series of openings with the plurality of batteries held in the second casing member. A conductor element is positioned inside the second casing member and underlies and contacts the other terminal surfaces on the opposite end of the batteries. A small aperture is formed within the first casing member to permit the insertion of the other meter probe to contact the conductor element and thus complete the test circuit. Mounted separately onto the second casing member is the usual hanger or display card. The hanger or display card can be readily removed from the dispenser at any time without rendering the dispenser inoperable for checking the voltage of the individual batteries.

BRIEF DESCRIPTION OF THE DRAWING

FIG. 1 is a perspective view of a battery dispenser according to the present invention;

FIG. 2 is an exploded perspective view showing the individual components of the dispenser prior to assembly;

FIG. 3 is a cross-sectional view of the upper casing half of the dispenser;

FIG. 4 is a cross-sectional view of the lower casing half of the dispenser, showing the hanger or display card attached thereto; and FIG. 5 is a partial plan view of the rearside of the lower casing half, showing means for removable locking the hanger or display card in place.

DESCRIPTION OF THE PREFERRED EMBODIMENTS

Referring to the drawing, there is shown a battery dispenser according to the invention which comprises a flat, circular, molded plastic casing 10 which is preferably made from two casing half members, an upper casing half 12 and a lower casing half 14. The casing half members 12, 14 co-fit together in the manner to be hereinafter described in detail and define therebetween an annular enclosure for storing a plurality of small, miniature hearing-aid batteries 16, there being six such batteries shown in this embodiment of the dispenser for purposes of illustration. Each one of the batteries 16 has terminal surfaces on opposite ends thereof, one terminal surface 16a being shown for each battery in the view of FIG. 1. Both casing halves 12, 14 are flat, circular members which can be integrally molded from a thermoplastic material. Preferably, the upper casing half 12 is molded from a transparent thermoplastic material while the lower casing half 14 is molded from an opaque or translucent thermoplastic material.

As illustrated in FIGS. 2 and 4, the lower casing half 14 is formed with a flat bottom wall 18, an upstanding circular rim 20 and an annular bottom marginal edge portion 22. Bottom wall 18 is recessed inwardly from marginal edge portion 22 forming a circular cavity 24 for purposes to be explained hereinafter. Also, the marginal edge portion 22 is formed with a series of serated undulations 26 which accommodate the user's fingers when grasping the dispenser.

The lower casing half 14 is further formed with a central tubular stud 28 which is divided into three equal sections 28a, 28b and 28c. Each section includes an outwardly projecting, tapered locking tab 30a, 30b and 30c for mounting upper casing half 12 as will be more fully described hereinafter.

Batteries 16 are arranged in a circular row inside of the lower casing half 14 and are spaced apart from each other by a series of embossments 32 which are formed in the bottom wall 18. The embossments 32 are spaced evenly apart from one another and also from the circular rim 20. Each embossment 32 is somewhat triangular in configuration with the opposite side walls 32a and 32b being shaped to accommodate the cylindrical batteries and to hold them in fairly loose fashion within the lower casing half 14. The batteries 16 also overlie a series of openings 34 formed in bottom wall 18 between pairs of embossments 32, the purpose of these openings to be made clear hereinafter. Pins 36 are also formed in the bottom wall 18 to assist in holding the batteries 16 within the spaces between the embossments 32.

The upper casing half 12 is formed with a flat top wall 38 and an outer cylindrical side wall 40. Side wall 40 fits freely inside the circular rim 20 on the lower casing half 14 and between the rim 20 and embossments 32 when the pair of casing half members are assembled. The upper casing half 12 further includes a central tubular wall 42 which is shorter than the side wall 40 and which is provided with an annular lip 44 at its lower end. This lip 44 is adapted to fit underneath and loosely engage the locking tabs 30a–30c formed respectively on each one of the three equal sections 28a–28c constituting the tubular stud 28 at the center of the lower casing half 14. The stud 28 being divided into the three equal sections 28a–28c is resilient and thus permits the annular lip 44 to be easily snapped into place underneath the locking tabs 30a–30c during assembly. It will be seen then by this construction that the pair of casing halves 12, 14 are securely locked together and that the upper casing half 12 is free to rotate inside the circular rim 20 about the tubular stud 28 on the lower casing half 14. The outer surface on side wall 40 is provided with serations 40a which facilitate grasping the same with the user's fingers to rotate the upper casing half 12.

A series of openings 46 are provided within the top wall 38 of the upper casing half 12 for checking the voltage of the plurality of batteries 16 held in the lower casing half 14. These openings 46 are also spaced apart from each other and arranged in a circular row such that each opening 46 registers or aligns with one of the plurality of batteries 16 in the lower casing half 14. The size of the openings 46 must of course be smaller than the individual batteries 16 in order to prevent them from passing therethrough but at the same time the openings 46 should be large enough to expose a substantial part of the terminal surface 16a of each battery at the top end thereof.

A smaller aperture 48 is formed within the top wall 38 of upper casing half 12 also for the purpose of checking the voltage of the plurality of batteries 16 as shall be described. This aperture 48 is located inside of the circular row of openings 46 and resides in close proximity to the central tubular wall 42.

Upper casing half 12 is further formed within its top wall 38 with a pair of semi-circular cut outs, 50a, 50b which partly circumscribe one of the series of openings 46. The pair of cut outs 50a, 50b define a dispensing outlet 52 for individually dispensing one battery at a time from the dispenser. The cut outs 50a, 50b also define a cover cap 54 which normally closes the outlet 52 and which is connected to the top wall 38 by means of an integrally formed, flexible hinge 56. Cap 54 is formed with an outwardly protruding tab 58 which fits into a slot 60 provided within the cylindrical side wall 40 of upper casing half 12 (see FIG. 3). Preferably, the tab 60 is formed with slightly upwardly tapered side walls as shown at 62 which in the normally closed position of the cap 54 are locked underneath a pair of dimples on each side of the slot 60 only one of such dimples being shown at 64 in FIG. 3. It will be seen that this construction provides a snap-lock to maintain the cap 54 in its normally closed position. It will also be noted in this construction that the cover cap 54 lies flush with the top wall 38 of upper casing half 12 and that there are no protuberances of any kind forming the dispensing outlet.

The side wall 40 of upper casing half 12 is also formed at its lower peripheral edge with at least one projection or lug 66 as illustrated in FIG. 3. This projection or lug 66 is adapted to lock with one of a series of slots 68 which are formed in the bottom wall 18 of lower casing half 14. The slots 68 are located around the inner periphery of the circular rim 20 and within the spaces between the rim 20 and the series of embossments 32. Slots 68 are spaced apart an equal distance from each other and each slot is radially aligned with one of the embossments 32.

As shown in FIGS. 2 and 4, a conductor element 70 is positioned inside the lower casing half 14. This conductor element 70 comprises a circular inner rim 70a which fits around the tubular stud 28, and a plurality of equally spaced apart branch members 70b which extend radially outwardly between pairs of embossments 32. Each branch member 70b also overlies one of the openings 34 in the bottom wall 18 of lower casing half 14. Preferably, the conductor element 70 is made of paper or cardboard and has an electrically conductive metal surface 72 on at least the upper side thereof. This conductive surface 72 may be a vacuum metalized coating applied to both the circular inner rim 70a and each one of the branch members.

Batteries 16 rest on each one of the branch members 70b of the conductor element 70 with the terminal surfaces (not shown) on opposite ends of each battery being in electrical contact with the conductive metal surface 72.

A hanger or display card 74 is attached to the rear side of the lower casing half 14. Such hanger or display card 74 has a circular base portion 74a which is connected thereto by a neck 74b. The circular base portion 74a fits within the circular cavity 24 formed on the rear side of the lower casing half 14 while the neck 74b extends through a corresponding slot 76 formed in the circular rim 20. A series of spaced apart, inwardly projecting lugs 78 formed around the periphery of the the marginal edge portion 22 of lower casing half 14 serve to hold the circular base portion 74a in place as best illustrated in FIG. 5. The hanger or display card 74 may include an elongated opening 80 for hanging the dispenser.

When it is desired to remove one of the batteries 16 from the dispenser, the user's finger is placed underneath the tab 58 and the cover cap 54 is lifted backwards by rotating it around the flexible hinge 56, thereby opening the discharge outlet 52. The battery 16 which is aligned with the outlet 52 may then be removed by simply turning the dispenser over such that the upper casing half 12 faces the palm of the user's hand. The battery will then fall freely through the outlet 52 onto the user's hand. The same procedure is repeated to remove another battery except that the discharge outlet 52 is first aligned with the next battery held in the spaced apart, circular row arrangement of batteries 16. This is done with the user's fingers grasping the serated side wall 40 by pushing the upper casing half 12 in either direction to unlock the lug 66 from the slot 68 which it engages and by then rotating the upper casing half 12 until the lug 66 engages with the next spaced apart slot 68 lying adjacent to the inner periphery of the circular rim 20. When this engagement occurs, the dispensing outlet 52 is automatically aligned with the next battery which is to be dispensed. Of course, the upper casing half 12 can be rotated to align the discharge outlet 52 with anyone of the plurality of batteries 10 to remove the same from the dispenser.

Each time a battery 16 is removed from the dispenser, the cover cap 54 is closed over the dispensing outlet 52 by pushing the tab 58 into the slot 60 until the tapered side walls 62 snap into place underneath the dimples 64 located on each side of the slot 60.

It may be noted that removal of a number of the batteries 16 from the dispenser in the manner as described will result in the cover cap 54 being frequently rotated about the flexible hinge 56 which can weaken the hinge and cause it to crack. Accordingly, the upper casing half 12 including the integral cover cap 54 is preferably made from a thermoplastic material which exhibits a high crack resistance. Most transparent thermoplastic materials such as polystyrene possess a rather low crack resistance and therefore are not recommended. A suitable thermoplastic material for the transparent upper casing half 12 is polyterephthalate which possesses a high crack resistance. Polyterephthalate is produced by Eastman under the trade name TENITE. The opaque or translucent lower casing half 14 can be made from most any suitable thermoplastic material such as polyethylene.

Checking the voltage of the individual batteries 16 may be readily accomplished with the battery dispenser according to the invention. To check the battery voltage, the lug 66 must be in engagement with one of the series of slots 68 adjacent the circular rim 20 so that the series of openings 46 formed in the top wall 38 of upper casing half 12 register with the plurality of batteries 16 held in the lower casing half 14. One probe of a voltmeter is then inserted through one of the openings 46 in order to make electrical connection with the terminal surface 16a on the upper end of one battery 16. The other meter probe is then inserted through the smaller aperture 48 also formed in the top wall 38. Upon insertion this probe immediately comes into contact with the conductive metal surface 72 on the conductor element 70. It will be noted in this connection that since the aperture 48 is located inside the circular row of openings 46 and close to the central tubular wall 42, the meter probe will contact the inner rim 70a of the conductor element 70. Pins 36 retain the batteries 16 in place between the pairs of embossments 32 and prohibit the batteries 16 from moving into a position where they can block the aperture 48 or contact the meter probe during the test procedure. Electrical connection with the terminal surfaces on the opposite ends of each of the batteries 16 is of course attained via the plurality of branches 70b on the conductor element 70 to complete the test circuit. It may be noted of course that the voltage of all the batteries 16 may be checked at one time by successively inserting the meter probe through each one of the openings 46 to contact the upper terminal surfaces 16a of each one of the batteries 16 while the second meter probe inserted through aperture 48 remains in contact with the conductor element 70.

An important feature of the invention resides in the use of a separate conductor element 70 which permits checking the voltage of the individual batteries 16 at any time before or after purchase of the dispenser and with or without the hanger or display card intact. The hanger or display card 74 can be readily removed without rendering the dispenser inoperable for checking the battery voltage by simply tearing it across the neck 74b leaving the circular base portion 74a intact or by also removing the base portion 74a from the rear side of lower casing half 14.

It may be more convenient to the user to check the voltage of the batteries 16 after the whole hanger or display card 74 has been removed by inserting the other meter probe through the plurality of openings 34 in the bottom wall 18 of lower casing half 14. This can be accomplished quite easily if the plurality of branches 70b on conductive element 70 are made narrow enough to expose part of each opening 34. Alternatively, of course, the conductor element 70 may be provided with a continuous conductive metal surface 72 applied to both of its sides. Electrical connection with the terminal surfaces on the lower end of each battery 16 may then be achieved by simply placing the meter probe through openings 34 into contact with the conductive metal surface on the rear side of conductor element 70.

The present invention is of course susceptible of a number of additional modifications without departing from the spirit of the invention. For example, the lower casing half 14 may be formed with additional pins to replace the series of embossments 32 in order to hold the batteries 16 spaced apart from each other. Additionally, the series of slots 68 which lie adjacent to the inner periphery of circular rim 20 may be replaced with an upstanding notch while the side wall 40 of the upper casing half 12 may be formed with a series of spaced apart slots to engage with the notch. Other modifications will readily occur to those skilled in the art.

What is claimed is:

1. Battery dispenser comprising: in combination, first and second casing members which co-fit together to define an enclosure for storing a plurality of small, miniature button cell batteries; means for rotatably mounting said first casing member to said second casing member; means cooperating with said second casing member for holding said plurality of batteries spaced apart from one another and for defining a predetermined number of compartments with each compartment adapted to hold one of said batteries; said first casing member including a series of openings in one wall thereof which register with said predetermined compartments so as to expose one terminal surface of each of said batteries at one end thereof for contact by a first voltmeter test probe; a conductor element positioned internal of said enclosure and having a first section in electrical contact with the terminal surface of each battery at the opposite end thereof; aperture means located in one wall of one of said first and second casing members and arranged relative to a second section of said conductor element for providing direct access to said conductor element internal of said enclosure by a second voltmeter test probe independent of the relative position between said first and second casing members, and a discharge outlet located in said first casing member for dispensing each battery.

2. Battery dispenser in accordance with claim 1 further comprising means for indexing each of said predetermined compartments with respect to said discharge outlet such that each compartment is maintained in a predetermined alignment relative to said discharge outlet.

3. Battery dispenser in accordance with claim 2 wherein said second section of said conductor element comprises a substantially circular ring and wherein said first section of each conductor element comprises a plurality of branch members extending outwardly from said circular ring into said predetermined compartments with each branch adapted to underlie a battery terminal.

4. Battery dispenser in accordance with claim 3 wherein said aperture means consists of at least one aperture located in said one wall of said first casing member.

5. Battery dispenser in accordance with claim 4 wherein said conductor element is made from paper or cardboard and has a metallized surface on the side thereof facing said batteries.

6. Battery dispenser in accordance with claim 3 wherein said first and second casing members are substantially flat, circular, molded plastic casing half members, said first casing half member comprising a substantially flat top wall, a central tubular inner wall with an annular rim projecting inwardly from said wall and an outer cylindrical side wall and wherein said second casing half member has a substantially flat bottom wall and a central stud member including at least one locking tab for engaging said annular rim of said first casing member.

7. Battery dispenser in accordance with claim 6 wherein said second casing half member has its outer periphery formed with a series of serrated undulations to accommodate the user's fingers when grasping said second casing half member.

8. Battery dispenser in accordance with claim 6 wherein said series of openings are provided in said top wall and wherein said means for holding said batteries comprises a plurality of embossments formed in said bottom wall in spaced apart, circular row arrangement.

9. Battery dispenser in accordance with claim 8 wherein pins are additionally formed in said bottom wall in order to assist in holding said plurality of batteries.

10. Battery dispenser in accordance with claim 8 wherein said means for indexing and aligning said series of openings with said plurality of batteries comprises a projecting formed on said cylindrical side wall which is adapted to engage with one of a series of spaced apart slots formed in said bottom wall, the arrangement being such that said openings are automatically and sequentially aligned with said plurality of batteries each time said projection engages one of said slots during rotation of said first casing half member.

11. Battery dispenser in accordance with claim 10 wherein a circular rim is formed in said bottom wall surrounding said outer cylindrical side wall and wherein said series of slots are arranged in spaced apart relation adjacent to the inner periphery of said circular rim.

12. Battery dispenser in accordance with claim 10 wherein said discharge outlet is formed in said top wall by a cut-out portion which partially circumscribes one of said openings and which forms a cover cap for said discharge outlet attached to said top wall by an integral flexible hinge.

13. Battery dispenser in accordance with claim 12 wherein said cover cap has a locking tab which extends through a slot formed in said outer cylindrical side wall and wherein means are provided for locking said tab in place.

14. Battery dispenser in accordance with claim 12 wherein said first casing half member is molded from a thermoplastic material having a high crack resistance.

15. Battery dispenser in accordance with claim 14 wherein said thermoplastic material is polyterephthalate.

* * * * *

UNITED STATES PATENT OFFICE
CERTIFICATE OF CORRECTION

Patent No. 3,995,767            Dated December 7, 1976

Inventor(s) Robert E. Brindley, et al

It is certified that error appears in the above-identified patent and that said Letters Patent are hereby corrected as shown below:

Column 8, line 13 - change the word "projecting" to

---projection---

Signed and Sealed this

Thirteenth Day of September 1977

[SEAL]

Attest:

RUTH C. MASON          LUTRELLE F. PARKER
*Attesting Officer*     *Acting Commissioner of Patents and Trademarks*